United States Patent Office 2,901,360
Patented Aug. 25, 1959

2,901,360

DRIED EGG PRODUCT AND METHOD OF PREPARATION

James M. Gorman and Arthur C. Keith, Topeka, Kans., assignors to Seymour Foods, Inc., Topeka, Kans., a corporation of Kansas No Drawing. Application August 11, 1958
Serial No. 754,186

5 Claims. (Cl. 99—210)

The present invention relates to a new and improved dried egg product incorporating therein an additive which not only prevents loss of aerating properties in the dried eggs over extended periods of storage, but also eliminates the development of off-odors and flavors in the dried egg product, the present invention is also directed to a method of preparing and storing a dried egg product to improve the functional performance of the product in baking following relatively long periods of storage.

Untreated dried whole eggs have in the past been found to be much less suitable for cake baking than frozen whole eggs. Dried whole eggs even when freshly used in cake baking, and particularly following periods of storage, exhibit less aerating power than fresh or defrosted frozen whole eggs. In an effort to overcome this loss in aerating properties, additives have been incorporated in the whole eggs prior to drying. Of these additives, sugar (sucrose) has been found capable of preserving the aerating properties of dried whole eggs. Sucrose has been added to liquid whole eggs prior to drying and the dried product has been stored for substantial periods of time with little or no loss in aerating properties as exhibited in subsequent cake baking.

While it has been found that sucrose will extend the aerating properties of dride whole eggs for as long as six to twelve months storage, it has also been noted that over long periods of storage at either cool or elevated temperatures, the sucrose treated dried whole eggs are subjected to oxidative changes far in excess to those changes that might occur in untreated dried whole eggs over equal periods of storage. While aerating power is retained in the sucrose treated product, off-odors, colors and flavors are very definitely developed. Untreated dried whole eggs will not normally acquire off-odors or flavors in this respect although they definitely lose their aerating properties. The "fishy" odor or flavor developed in sucrose treated dried whole eggs is very objectionable and has, in effect, created as much a problem as that of loss of aerating properties when sucrose treated dried whole eggs are used in cake baking.

It is an object of the present invention to provide a new and improved dried egg product exhibiting retained aerating properties and capable of being stored over protracted periods without the development of oxidative changes to an extent that off-odors and flavors result.

It is a further object of the present invention to provide a new and improved treated dried egg product including therein a starch hydrolysate, such as corn and malt syrups, having a dextrose equivalent adequate to retain in the product the requisite aerating properties without off-odor, color and flavor development.

Another object is to provide a new and improved method of preparing and storing a dried egg product which exhibits improved cake baking aerating properties without off-odor development over long periods of storage.

Other objects not specifically set forth will become apparent from the following detailed description of the present invention.

It has been found that commercial corn syrup or corn syrup solids when added to whole eggs, fortified whole eggs, or egg yolks, provide for retention of the aerating properties of the dried egg products without attendant off-odor, off-flavor and off-color development. Effective syrups and syrup solids are the acid hydrolysates of cornstarch or sorghum starch, and other acid hydrolysates of other starches as well as malt and maltose syrups prepared by enzymatic hydrolysis are capable of providing for aerating property retention and off-odor and flavor development suppression. The dextrose equivalent of the syrups or syrup solids used as additives in dried whole eggs should range from about 20% to 35% based on the dry weight of the hydrolysates. Suitable results can be obtained within a range of from about 20% to 25% dextrose equivalent syrups or syrup solids. As is well known, dextrose equivalent refers to the copper reducing power calculated as dextrose and expressed as a percentage of the dry substances.

The syrups or syrup solids should be added to the egg product in quantities ranging from about 5% to 20% based on the liquid weight of the product prior to drying. As little as 5% commercial corn syrup or corn syrup solids will aid in the retention of the leavening, binding and emulsifying properties of the final dried whole egg product and as much as 20% commercial corn syrup or corn syrup solids will not impair these functional characteristics. Similarly, the binding and emulsifying properties of treated dried egg yolks are not impaired by presence of the additive at quantities within the range specified. It has been found that, preferably, 10% to 15% additive provides the best over-all results.

In preparing a dried whole egg product, it has been found desirable to utilize fortified whole eggs which have been adjusted from a solids content of from about 25% to 26% to a solids content of 28% to 32% by the use of liquid egg yolk. Preferably, the fortified whole egg should have a solids content of about 31%. The additive exhibiting the requiesit dextrose equivalent is then mixed with the liquid whole eggs and the mixture is then dried by any suitable process. Drying may be accomplished by the fluff process or the product may be spray dried utilizing pressure or centrifugal atomization. Regardless of the dryinge procdure followed, the air temperature and volume should be sufficient to reduce the moisture in the finished dried egg product to 8% or less and preferably to 3½% or less where longer keeping qualities are desired.

To enhance the keeping qualities of the improved dried whole egg product, it has been found preferable to pack the product in containers that offer substantial protection against moisture build-up in the product. Such containers are available in the form of multi-wall fiber drums which include an asphalt barrier to retard moisture transfer. To further enhance the properties of the treated dried whole eggs, it is desirable to store the sealed product under cool and dry storage conditions. Preferably, the product enclosed in the type of container described is stored at 45° F. plus or minus 5° F. Under such storage conditions it has been found that the product will retain its aerating properties for at least six to twelve months without developing off-odors or flavors. However, it will be understood that the product when suitably packaged may be stored at room temperatures for at least several months without serious loss in functional performance.

The following examples illustrate the improved properties of dried whole eggs treated in accordance with the teachings of the present invention and used in cake baking.

*Sponge cake formula*

|  | Grams | Percent |
|---|---|---|
| Sugar | 114.00 | 33.50 |
| Liquid Egg [1] | 114.00 | 33.50 |
| Salt | 1.75 | .50 |
| N. F. Milk Solids | 4.25 | 1.25 |
| Water | 34.00 | 10.00 |
| Vanilla | 2.00 | .60 |
| Flour | 70.00 | 20.65 |
|  | 340.00 | 100.00 |

[1] Dried whole eggs used on egg solids equivalent basis.

In using the foregoing formula in carrying out the several baking performance tests listed below, the batter was prepared in a five quart mixer using a medium speed for mixing followed by whipping over a period of 10 minutes. Each cake included 340 gms of batter transferred to an 8 by 2 inch pan with the cakes being baked 22 minutes at 375° F. The batter gravities were determined by filling an 8 ounce aluminum cup with batter and recording the weight in grams. Gravity was then calculated by dividing the weight of the batter by the weight of an equivalent volume of water at the same temperature. Cake volume was determined in accordance with the standard rape seed displacement method.

*Baking performance of egg products before storage*

| Product | Percent Corn Syrup or Syrup Solids | Batter Gravity, gms./cc. | Cake Volume, cc. |
|---|---|---|---|
| Frozen Whole Egg Control | 0 | 0.378 | 1,615 |
| Dried Whole Egg | 0 | 0.472 | 1,290 |
| Do | 5 | 0.398 | 1,535 |
| Do | 10 | 0.391 | 1,610 |
| Do | 15 | 0.375 | 1,615 |
| Do | 20 | 0.380 | 1,600 |

*Baking performance of egg products after six months storage at 45° F. ± 5° F.*

| Product | Percent Corn Syrup or Syrup Solids | Batter Gravity, gms./cc. | Cake Volume, cc. |
|---|---|---|---|
| Frozen Whole Egg Control | 0 | 0.375 | 1,610 |
| Dried Whole Egg | 0 | 0.635 | 950 |
| Do | 5 | 0.422 | 1,440 |
| Do | 10 | 0.384 | 1,580 |
| Do | 15 | 0.368 | 1,615 |
| Do | 20 | 0.372 | 1,590 |

From the foregoing it will be noted that batter gravity and cake volume of those cakes using treated dried whole eggs compare favorably with those cakes made from frozen whole eggs. The batter gravities and cake volumes of those cakes using untreated dried whole eggs fell off considerably, particularly following an extended period of storage. The results of the tests conducted before storage illustrates aerating properties retention in using syrup or syrup solids additives. These results compare favorably with the advantageous use of sucrose in this respect. However, following extended storage there is no off-odor, off-flavor or off-color development in the syrup or syrup solids treated dried whole egg product which can be passed on or incorporated in a cake. Sucrose dried whole egg products under cool storage conditions may retain aerating properties for a year but the "fishy" odors and off-color developed are exceedingly undesirable. Dried whole egg products treated with syrup or syrup solids will also retain good solubility and aerating properties over extended periods of storage but the "fishy" odor, off-flavor and off-color will not occur. Such odors and flavors are markedly present in sucrose treated egg products as readily determined by organoleptic examination.

While the foregoing illustrates the improvements in functional performance of dried whole eggs treated in accordance with the teachings of the present invention, it will be understood that similar improved results will be obtained where treated dried egg yolks are substituted for the treated dried whole eggs. The treated dried egg yolks are particularly useful in preparing yeast leavened baker goods such as sweet rolls and the like and in treated dried form may be stored for long periods in the manner of treated whole or fortified whole eggs without off-odor or flavor development. With the treated dried egg yolk product it has been found preferable that the yolks used have a minimum solids content of 43%.

Obviously certain modifications and variations of the invention as hereinbefore set forth may be made without departing from the spirit and scope thereof, and therefore only such limitations should be imposed as are indicated in the appended claims.

We claim:

1. The method of preparing and storing a dried egg product containing yolk which product exhibits improved baking properties without off-odor development over long periods of storage, said method including treating liquid egg material with an additive selected from the group consisting of corn syrup and malt syrup having a dextrose equivalent of from about 20% to 35% and in quantities ranging from about 5% to 20% by weight, drying the treated egg material to a moisture content of no greater than 8%, and storing the dried product in substantially moisture tight containers.

2. The method of preparing and storing a dried whole egg product which exhibits improved cake baking aeration properties without off-odor development over long periods of storage, said method including treating fortified liquid whole eggs with an additive selected from the group consisting of corn syrup and malt syrup having a dextrose equivalent of from about 20% to 25% and in quantities ranging from about 10% to 15% by weight, drying the treated whole eggs to a moisture content of no greater than 3½%, and storing the dried product in substantially moisture tight containers.

3. The method of preparing and storing a dried whole egg product which exhibits improved cake baking aeration properties without off-odor development over long periods of storage, said method including treating fortified liquid whole eggs with an additive selected from the group consisting of corn syrup and malt syrup having a dextrose equivalent of from about 20% to 35% and in quantities ranging from about 5% to 20% by weight, drying the treated whole eggs to a moisture content of no greater than 8%, and storing the dried product in substantially moisture tight containers under cool storage conditions on the order of 45° F plus or minus 5° F.

4. A dried egg product containing yolk and having a moisture content which is no greater than 8%, said product including an additive selected from the group consisting of corn and malt syrups which additive has a dextrose equivalent of from about 20% to 35%, said additive having been added to the egg constituents of said product prior to the drying thereof and in quantities ranging from about 5% to 20% by weight based on total liquid weight prior to drying.

5. A dried egg product containing yolk and having a moisture content which is no greater than 8%, said product including an additive selected from the group consisting of corn and malt syrups which additive has a dextrose equivalent of from about 20% to 25%, said additive having been added to the egg constituents of said product prior to the drying thereof and in quantities ranging from about 5% to 20% by weight based on total liquid weight prior to drying.

References Cited in the file of this patent

UNITED STATES PATENTS 1,203,983     Contant _____ Nov. 7, 1916

FOREIGN PATENTS 314,273     Great Britain _____ June 27, 1929

UNITED STATES PATENT OFFICE
CERTIFICATE OF CORRECTION

Patent No. 2,901,360                                                          August 25, 1959

James M. Gorman et al.

It is hereby certified that error appears in the printed specification of the above numbered patent requiring correction and that the said Letters Patent should read as corrected below.

Column 1, line 19, following "egg" insert -- product during storage. In addition to the new and improved dried egg --; line 39, for "dride" read -- dried --; column 2, line 48, for "requiesit" read -- requisite --; line 53, for "dryinge" read -- drying --; same line for "procdure" read -- procedure --; column 4, line 23, for "baker" read -- baked --.

Signed and sealed this 23rd day of February 1960.

(SEAL)

Attest:

KARL H. AXLINE                                                  ROBERT C. WATSON
Attesting Officer                                            Commissioner of Patents